(12) United States Patent
Krumpolz et al.

(10) Patent No.: US 6,626,045 B2
(45) Date of Patent: Sep. 30, 2003

(54) PRESSURE MEASUREMENT DEVICE

(75) Inventors: Josef Krumpolz, Karben (DE); Bernhard Friebe, Neu-Anspach (DE)

(73) Assignee: WIKA Alexander Wiegand GmbH & Co., Klingenberg/Main (DE)

( * ) Notice: Subject to any disclaimer, the term of this patent is extended or adjusted under 35 U.S.C. 154(b) by 0 days.

(21) Appl. No.: 09/834,686

(22) Filed: Apr. 13, 2001

(65) Prior Publication Data

US 2002/0023501 A1 Feb. 28, 2002

(30) Foreign Application Priority Data

Apr. 17, 2000 (DE) .......................... 200 07 053

(51) Int. Cl.$^7$ ................................ G01L 9/14
(52) U.S. Cl. ............... 73/722; 73/723; 73/728; 73/733; 73/735; 73/749
(58) Field of Search ................ 73/700, 756; 184/108

(56) References Cited

U.S. PATENT DOCUMENTS

| | | | | |
|---|---|---|---|---|
| 4,827,095 A | * | 5/1989 | Clark et al. ............... | 200/82 C |
| 4,936,148 A | * | 6/1990 | Shaw et al. ............... | 338/32 H |
| 5,024,294 A | * | 6/1991 | Van Fossen et al. ....... | 184/108 |
| 5,061,832 A | * | 10/1991 | Squires ..................... | 200/82 C |
| 5,219,041 A | * | 6/1993 | Greve ........................ | 184/108 |
| 6,089,098 A | * | 7/2000 | Tylisz et al. ............... | 73/722 |

FOREIGN PATENT DOCUMENTS

| | | |
|---|---|---|
| DE | 3104379 A1 | 7/1981 |
| DE | 19917100 A1 | 4/1998 |

* cited by examiner

*Primary Examiner*—Edward Lefkowitz
*Assistant Examiner*—Andre Allen
(74) *Attorney, Agent, or Firm*—Roth & Goldman, P.A.

(57) ABSTRACT

A pressure measurement device comprising a housing enclosing an elastic pressure measurement element and a magnet attached to the measurement element. First and second Hall sensors operatively positioned near the magnet are connected to an electrical circuit which processes the sensor outputs to provide first and second output signals. The positions of the Hall sensors can preferably each be adjusted from outside the housing.

20 Claims, 3 Drawing Sheets

Figure 9:
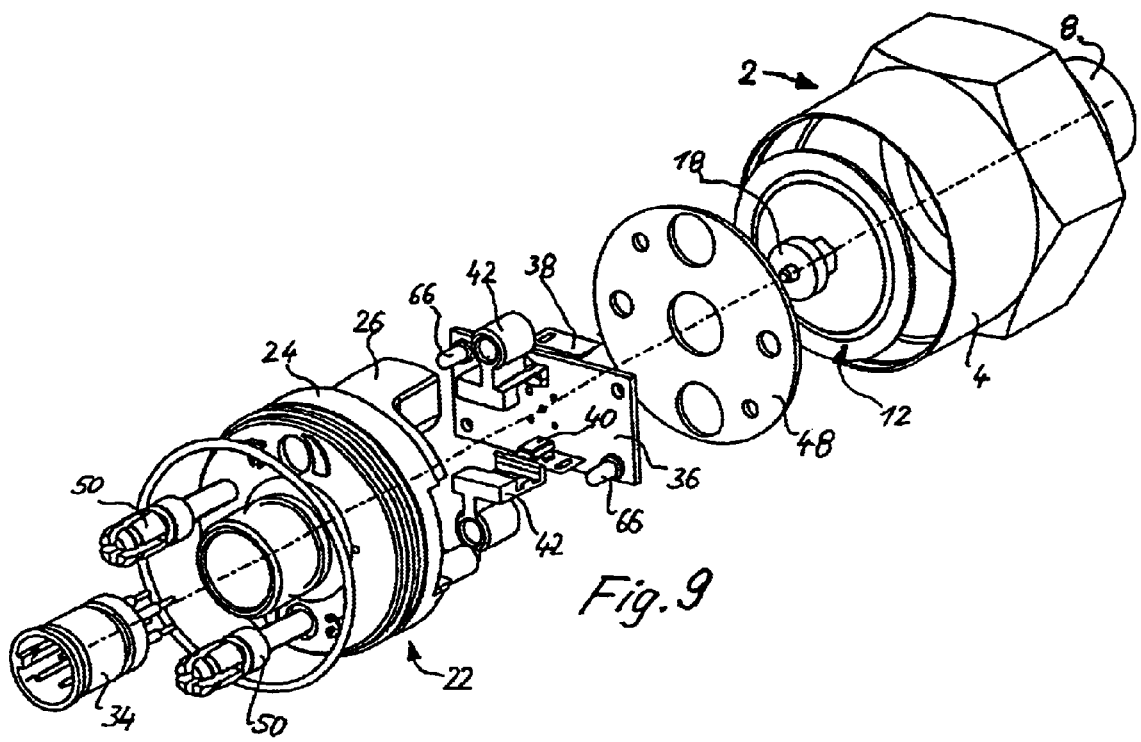

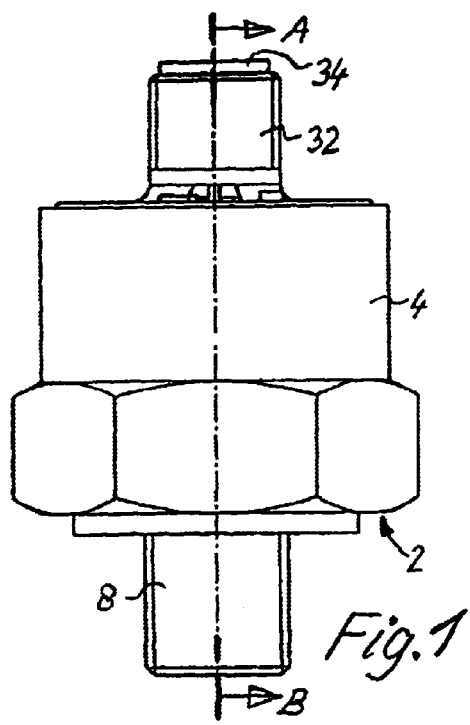
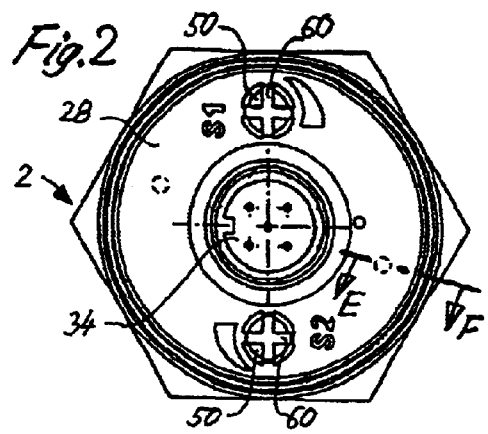
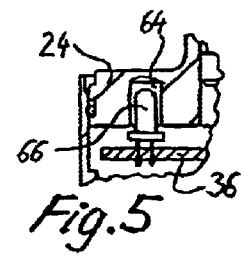
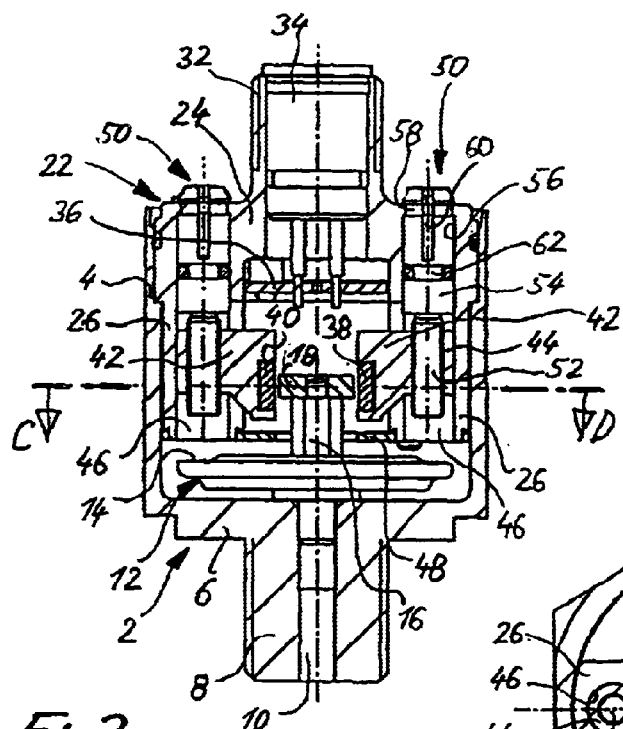
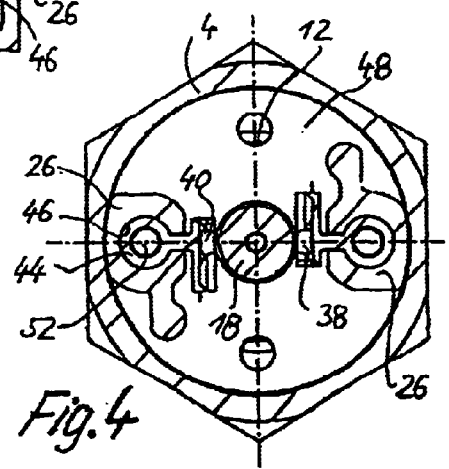

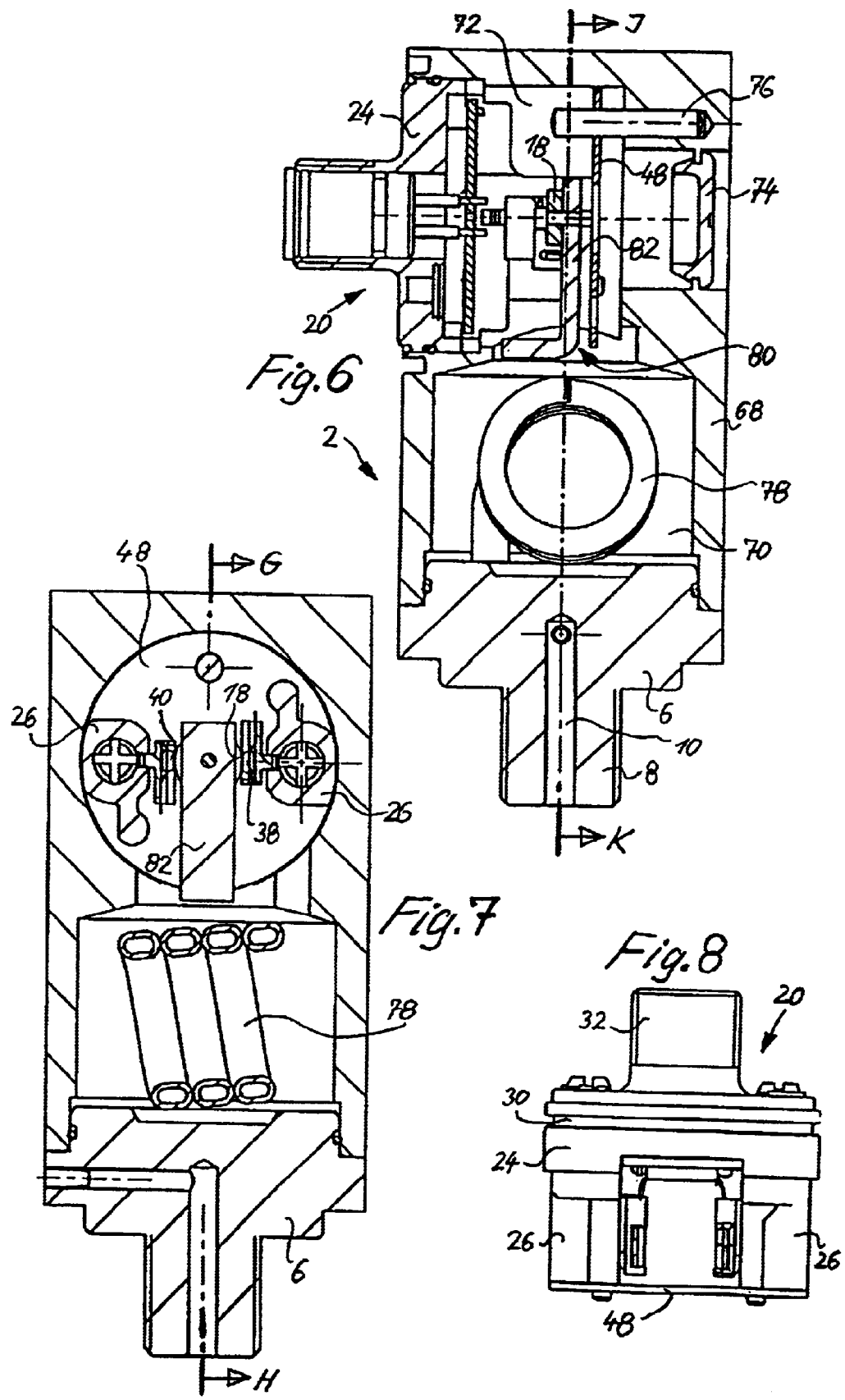

PRESSURE MEASUREMENT DEVICE

The invention concerns a pressure measurement device.

Such a pressure measurement device is known in which a magnet, which is designed as a permanent magnet, travels a corresponding to the pressure acting on an elastic measurement element. A Hall-effect sensor, referred to here as a Hall sensor, is exposed to the magnetic field of the magnet.

Essentially, two types of Hall sensors are known. A Hall sensor designed as a so-called linear sensor generates an analog sensor output voltage which is proportional to the magnetic flux perpendicular through the Hall plate of the Hall sensor. A Hall sensor designed as a so-called switch sensor is provided with an integrated comparator with predefined switch points and delivers a digital sensor output voltage. In a pressure measurement device that is provided with a Hall sensor, the sensor output voltage of the electric circuit of the pressure measurement device is further processed. In the case of a linear sensor, the electronic circuit delivers a voltage signal proportional to the pressure measured as an output signal. In this case, the pressure measurement device acts as a pressure measurement converter or a pressure teletransmitter. In the case of a switch sensor, the digital sensor output voltage can be applied to a semiconductor switch of the electronic circuit, which then delivers a switching signal as an output signal of the pressure measurement device. In this case the pressure measurement device is a pressure switch. The invention concerns both a pressure measurement device that operates as a pressure measurement converter or a pressure teletransmitter and a pressure measurement device that operates as a pressure switch.

The known pressure measurement device is a pressure measurement converter and delivers a device output signal proportional to the pressure measured. When both a pressure-proportional output signal and a switching signal are necessary, a second pressure measurement device must be provided to generate the switching signal. Even when two switching signals are necessary, this requires two separate pressure measurement devices according to the prior art.

A pressure measurement device with a Hall sensor operating as a pressure switch is known from U.S. Pat. No. 6,089,098. In this known pressure measurement device, the compressive force of a spring that holds a magnet in contact with a plate spring serving as a measurement element can be adjusted from the outside by means of a set screw. Also, in this known pressure measurement device the distance between the Hall sensor and the magnet can be adjusted by means of a set screw that is arranged entirely inside the pressure measurement device.

The object of the invention is to improve the generic pressure measurement device with the result that it can deliver more than one output signal.

A further object is to make the pressure measurement device adjustable and calibratible in a simple manner, preferably "on site", i.e., at the use or installation site of the pressure measurement device.

The aforementioned object is accomplished according to the invention by means of the pressure measurement device according to claim 1 characterized in that at least a second Hall sensor is arranged to the side near the magnet outside of its path of movement on the sensor carrier and that the sensor output voltage of the second Hall sensor is further processed by the electronic circuit into a second output signal of the pressure measurement device.

It has been determined that when the path of movement of the magnet runs to the side near the first Hall sensor, at least one second Hall sensor can be associated with the magnet, which is also arranged to the side near the magnet outside its path of movement. The at least one second Hall sensor is mechanically and electrically independent of the first Hall sensor. The sensor output voltage of the second Hall sensor is further processed by the electronic circuit into a second output signal of the pressure measurement device. Each of the two Hall sensors can be designed either as a linear sensor or a switch sensor such that the pressure measurement device can deliver as output signals, for example, both a pressure-proportional output signal as a switching signal or two switching signals independent of each other. Because of the design according to the invention, this multifunctionality is obtained with only one elastic measurement element and only one magnet.

Provision can be made in an advantageous embodiment of the invention that the sensor carrier has a base plate and two guide rails attached on the inside of the base plate. Each Hall sensor is attached on a sensor mount that is displaceable along a path of movement on one of the guide rails that runs parallel to the path of movement of the magnet. A set screw is associated with each Hall sensor. The respective set screw has a threaded section and a cylindrical head section. The threaded section is in threaded engagement with the sensor mount, and the head section is pivotably mounted in the base plate immovable in the axial direction of the set screw, whereby the end of the head section is exposed on the outside of the base plate. In this manner, it is possible, from the outside, i.e., without opening the pressure measurement device, to adjust the setting of each of the two Hall sensors and thus to adjust the Hall sensor "on site".

In an advantageous embodiment of the invention, provision can also be made that the sensor carrier has a base plate made of a light-permeable material and that a light-emitting diode that is arranged on the inside of the base plate is associated with each of the Hall sensors. The respective light-emitting diode serves, for example, to indicate the switch state of the associated Hall sensor and thus enables visual state monitoring "on site". Since the base plate is made of a light-permeable material, the light of the light-emitting diode can penetrate outward through the base plate without the necessity of an opening or the like, which would render sealing the inside of the pressure measurement device difficult. Additional advantageous embodiments of the invention are defined in the dependent claims.

Exemplary embodiments of the invention are depicted in the drawings and are explained in detail in the following. They depict:

FIG. 1 a side view of a pressure measurement device according to a first embodiment;

FIG. 2 a top plan view of the pressure measurement device according to FIG. 1;

FIG. 3 a sectional view along A-B in FIG. 1;

FIG. 4 a sectional view along C-D in FIG. 3;

FIG. 5 a sectional detail along E-F in FIG. 2;

FIG. 6 a sectional view along G-H in FIG. 7 through a pressure measurement device according to a second embodiment;

FIG. 7 a sectional view along J-K in FIG. 6;

FIG. 8 a side view of an assembly that is present in both the first embodiment and in the second embodiment;

FIG. 9 an exploded perspective view of the first embodiment; and

Figure 10:
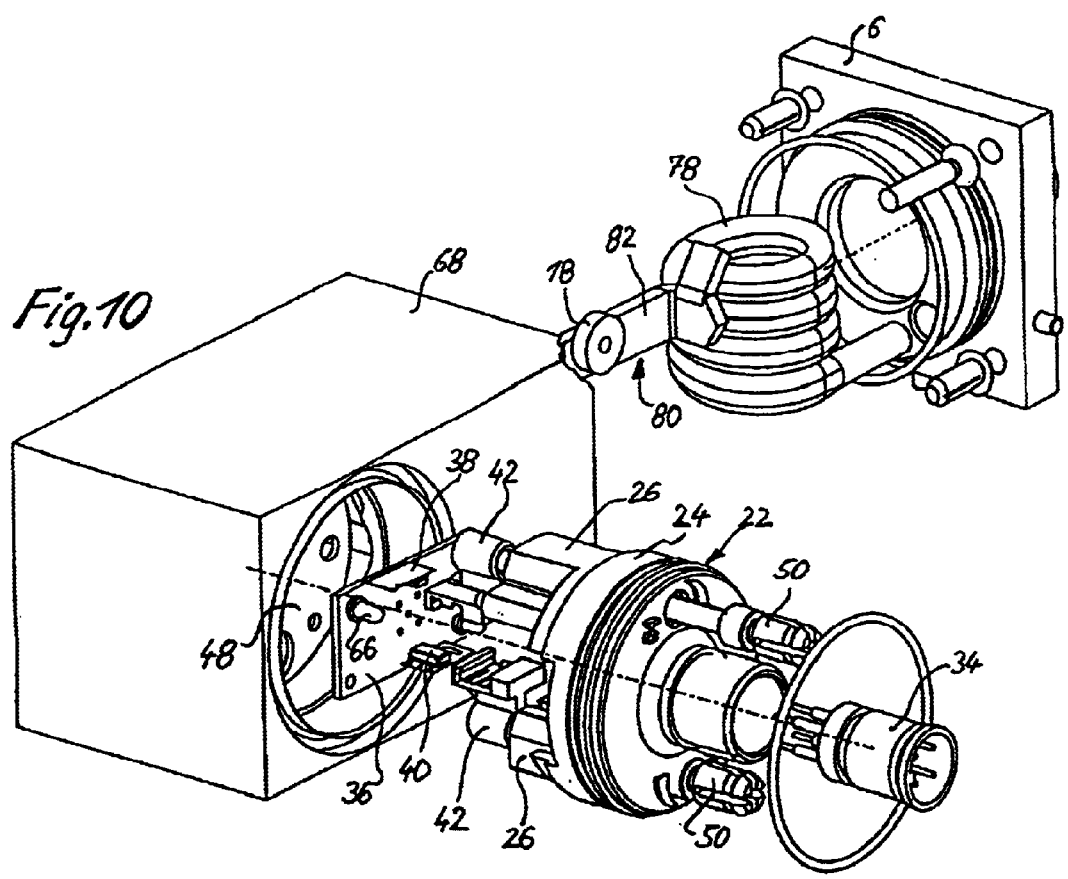

FIG. 10 an exploded perspective view of the second embodiment.

In the following explanation, the same reference characters are used for identical or corresponding elements of the embodiments.

First, the first embodiment of the pressure measurement device is explained with reference to FIGS. 1 through 5, 8 and 9.

The first embodiment depicted includes a measurement element housing 2 that consists of a cylindrical wall 4 and a base 6, which are designed integrated in a single piece made of metal. A device connector 8, by means of which the pressure measurement device can be connected to the system that guides the substance to be measured, whose pressure is to be measured by means of the pressure measurement device, is formed on the base 6. A borehole 10 runs axially through the device connector 8.

An elastic measurement element, which is designed, in the exemplary embodiment depicted, as an aneroid capsule 12 is arranged inside the measurement element housing 2. The aneroid capsule 12 has a pin that is fitted into the borehole 10 such that the substance to be measured can arrive in the interior of the aneroid capsule 12 through the borehole 10 and the pin. The top half 14 of the capsule 12 in FIG. 3 is deflected more or less depending on the level of pressure prevailing in the aneroid capsule 12. A bolt 16 is affixed on the top half 14 of the capsule; a magnet 18 is in turn attached to the bolt. The magnet 18 is an annular permanent magnet. Because of its connection with the top half 14 of the capsule, the magnet 18 moves along a rectilinear path of movement corresponding to the pressure-dependent deflection of the top half 14 of the capsule, which path coincides, in the exemplary embodiment depicted, with the axis of the bolt 16. The plane of the annular magnet 18 runs perpendicular to its path of movement. The north and south poles of the magnet 18 lie on an axis running in the direction of the path of movement of the magnet 18, i.e., on the top and bottom faces, respectively, of the magnet 18 in FIG. 3.

An assembly 20, depicted in elevation in FIG. 8 and described in detail in the following, is inserted in the measurement element housing 2. All functional elements of the pressure measurement device with the exception of the elastic measurement element and the magnet 18 are included in the assembly 20.

The assembly 20 includes a sensor carrier 22 that has a base plate 24 and two guide rails 26. The sensor carrier 22 is inserted in the measurement element housing 2 such that the external side 28 of the base plate 24 is exposed on the outside of the pressure measurement device and the internal side of the base plate 24 is turned toward the interior of the measurement element housing 2. The base plate 24 sits on an inside shoulder of the wall 4 of the measurement element housing (see FIG. 3) and has on its circumferential wall a circumferential groove 30, in which is placed an O-ring which is in sealing contact with the inside of the wall 4.

Centrally, on the external side of the base plate 24, a pin 32 is formed, into which an electrical connecting plug 34 is sealingly fitted. A printed circuit board 36 is arranged near the internal side of the base plate 24 and attached to the base plate 24. The circuit board 36 carries an electronic circuit and is electrically connected with the connecting plug 34.

The two guide rails 26 are attached to the base plate 24 and extend downward from its internal side out (in FIG. 3). The two guide rails 26 are arranged on diametrically opposite sides relative to the magnet 18 or relative to its path of movement, as is particularly discernible in FIG. 4. In the exemplary embodiment depicted, the base plate 24 and the two guide rails 26, which jointly form the sensor carrier 22, as well as the pin 32, are integrated with each other as a single injection-molded plastic part. For reasons further explained later, the base plate 24 and, consequently, in the exemplary environment depicted, the entire sensor carrier 22 are preferably made of a light-permeable material.

The assembly 20 further has a first Hall sensor 38 and a second Hall sensor 40. Each of the two Hall sensors 38 and 40 is attached to a sensor mount 42 associated therewith that has a cylindrical section 44. In each of the two guide rails 26, a groove 46 with a slit on the side is formed with a profile complementary to the profile of the cylindrical section 44 of the sensor mount 42. The cylindrical section 44 of each of the two sensor mounts 42 is inserted into the groove 46 of the associated guide rail 26 such that the sensor mounts 42 are displaceable on the guide rails 26. The two guide rails 26 and the grooves 46 formed therein run in a direction such that the paths of movement, along which the respective sensor mount 42 is displaceable, run parallel to the path of movement of the magnet 18.

The two sensor mounts 42 hold the first Hall sensor 38 and the second Hall sensor 40 as depicted in FIG. 3 such that the two Hall sensors 38 and 40 are arranged at a small distance from the magnet 18 to the side thereof and outside the path of movement of the magnet 18. In the exemplary embodiment depicted, the two Hall sensors 38 and 40 are arranged on diametrically opposite sides relative to the magnet 18. Thus, the magnet can move unimpaired along its path of movement between the two Hall sensors 38 and 40. With this movement, the magnetic field of the magnet 18 passing through the two Hall sensors 38 and 40 travels along the two Hall sensors 38 and 40.

As seen from the preceding description, the two Hall sensors 38 and 40 are arranged mechanically independent of each other. That means that the position of one of the two Hall sensors relative to the magnet 18 does not simultaneously determine the position of the other one of the two Hall sensors relative to the magnet 18. The sensor carrier 22 and two sensor mounts 42 do hold the two Hall sensors 38 and 40 in a predefined or preset position relative to the magnet 18. However, this position can be predefined or changed for each of the two Hall sensors 38 and 40 independent of the position of the other one of the two Hall sensors.

A metal disk 48 is attached on the ends of the guide rails 26 facing away from the base plate 24. This disk serves on the one hand as overload protection for the aneroid capsule 12. In the event of an overload, the top half 14 of the capsule presses against the disk 48 before the overload can damage or destroy the aneroid capsule 12. The disk 48, which runs substantially parallel to the base plate 24, also serves for mechanical stabilization of the entire assembly 20. The disk 48 holds the ends of the two guide rails 26 facing away from the base plate 24 at the proper distance from each other and thus prevents, for example, temperature-induced deformations of the two guide rails 26. It is thus ensured, in turn, that the two guide rails 26 accurately guide and hold the sensor mounts 42 and, with them, the Hall sensors.

The assembly 20 further includes a set screw 50 for each of the two sensor mounts 42, by means of which the associated sensor mount 42 can be moved along its guide rail 26 and can be held in the set position.

The set screw 50 has a threaded section 52 which is in threaded engagement with the associated sensor mount 42. For this purpose, the cylindrical section 44 of the sensor mount 42 is provided with an internal thread into which the threaded section 52 is screwed. The set screw 50 further has a circular cylindrical head section 54, which is pivotably fixed in a throughhole 56 formed in the base plate 24. This arrangement is such that the end surface of the head section 54 is exposed on the external side 28 of the base plate 24 such that a tool can be applied to the head section 54 there in order to be able to turn the set screw 50 from the outside, i.e., from outside the entire pressure measurement device.

On the head section 54, a circumferential groove 58 is formed, in which a projection designed as a torus integrated as a single piece with the base plate 24, engages. This projection and the circumferential groove 58 form axial protection for the set screw 50. The set screw 50 is pivotable in the throughhole 56, but immovable in the axial direction of the set screw 50 because of the axial protection. Two intersecting axial slits 60 starting from the end surface of the head section are formed in the head section 54. These make it possible for the set screw 50 to be pushed from below (in FIG. 3) into the associated throughhole 56 and, in the process, for the head section 54 to be elastically compressed radially in the region of the axial slits 60, until the torus can snap into the groove 58. The entire set screw 50 is preferably made from a plastic material.

The head section 54 of the set screw 50 further has a circumferential sealing groove 62 into which is placed a sealing O-ring, which provides for a leakproof seal between the set screw 50 and the throughhole 56 and simultaneously secures the set screw 50 in its pivot position as a result of the static friction on the set screw and the wall of the throughhole.

The preceding description applies to both of the two set screws 50. It can be seen that by means of the set screws 50, each of the two sensor mounts 42, and with them each of the two Hall sensors 38 and 40, can be displaced and adjusted along a path of movement parallel to the path of movement of the magnet 18. This adjustment can be made on the completely assembled and installed pressure measurement device from the outside, without having to open the pressure measurement device. Yet, the necessary sealing of the interior of the pressure measurement device is taken care of by means of the described design of the set screws 50.

Two blind holes 64, whose positions are indicated by dotted-line circles in FIG. 2, are formed in the base plate 24. Each of the two blind holes 64 starts from the internal side of the base plate 24 and extends almost to its external side 28 such that there is a thin wall at the bottom of the blind hole 64, as depicted in FIG. 5. The circuit board 26 has two light-emitting diodes 66, each of which projects into one of the two blind holes 64. When the light-emitting diodes 66 emit light, it passes through the bottom wall since the base plate 24 is made from a light-permeable material so that this escape of light is possible.

Each of the two light-emitting diodes 66 is associated with one of the two Hall sensors 38 and 40 and is, for example, inserted into the electronic circuit on the circuit board 36 such that the light-emitting diode lights when the sensor output voltage delivered by the associated Hall sensor reaches or is at a predefined level. Thus, each of the light-emitting diodes 66 enables visual monitoring of the switching state of the associated Hall sensor directly on the pressure measurement device. This is accomplished because of the design described, without the housing of the pressure measurement device, which, in the exemplary embodiment described, consists of the measurement element housing 2 and the base plate 24, having to have an additional opening to permit the escape of light. That means, in other words, that the additional function of the optical switching state display requires no additional sealing measures.

The two Hall sensors 38 and 40 are preferably designed as switching sensors. In the operation of the pressure measurement device, the electronic circuit is fed a supply voltage via the electrical connecting plug 34. The electronic circuit applies an input voltage to the Hall sensors. The components of the electronic circuit and the connection lines to the two Hall sensors are not depicted in the drawings. When the magnet 18 moves far enough on its path of movement as a function of the pressure of the substance to be measured acting in the aneroid capsule 12, the level of the digital sensor output voltage of, for example, the first Hall sensor 38 changes. The pressure at which this change occurs is the first switching pressure. The electronic circuit delivers, as an output signal, a first switching signal, which is available on the connecting plug 34, corresponding to the digital sensor output voltage of the first Hall sensor 38. Depending on the design of the electronic circuit and the arrangement of the first Hall sensor 38 on the sensor mount 42, provision can be made that the switching signal either rises or falls with rising pressure and exceeding the switching pressure. The switching pressure, i.e., that pressure, at which the switching signal changes, can be changed and set by bringing the first Hall sensor 38 into a position on the guide rails 26 corresponding to the desired switching pressure.

The preceding explanation of the manner in which the first switching signal is generated based on the digital sensor output voltage of the first Hall sensor 38 also applies analogously to the processing of the digital sensor output voltage of the second Hall sensor 40 to a second switching signal. However, it should be noted that the position of the second Hall sensor 40 relative to the magnet 18 is independent of the position of the first Hall sensor 38 and is changeable independent of said position. That means, in other words, that the second switching pressure, at which the second switching signal changes, is independent of the first switching pressure, at which the first switching signal changes. Thus, the pressure measurement device, designed as a pressure switch in the case under consideration, delivers two output signals independent of each other. It should also be noted that the processing of the sensor output voltage of the second Hall sensor 40 by the electronic circuit occurs independent of the processing of the sensor output voltage of the first Hall sensor 38 by the electronic circuit such that the two Hall sensors are in this sense electrically independent of each other.

In deviation from the case described in the preceding, in which both Hall sensors are switching sensors and thus the pressure measurement device is a pressure switch, one of the two Hall sensors can be a linear sensor such that one output signal of the pressure measurement device is pressure-proportional and the other output signal is a switching signal. Further, in deviation from the case described in the preceding, both Hall sensors can be linear sensors, whose analog sensor output voltages are fed to a respective associated comparator circuit integrated into the electronic circuit. Each of the two comparator circuits delivers a digital output voltage, which is fed as a control signal to a first or to a second semiconductor switch of the electronic circuit such that the two semiconductor switches then deliver two switching signals as output signals of the pressure measurement device.

In the exemplary embodiment described in the preceding, two Hall sensors electrically and mechanically independent of each other are provided. However, more than two Hall sensors independent of each other can be provided if the pressure measurement device is to deliver more than two output signals.

The second embodiment of the pressure measurement device, depicted in FIGS. 6, 7, and 10, differs from the first embodiment only in the design of the elastic measurement element and the measurement element housing 2. The second embodiment of the pressure measurement device has the same assembly 20 that is present in the pressure measurement device according to the first embodiment and has already been explained in conjunction therewith, such that the explanation of the assembly 20, its elements, and the function of its elements also applies to the second embodiment of the pressure measurement device.

The measurement element housing 2 of the second embodiment includes the base 6 with the device connector 8 formed thereon and the borehole 10 formed in the device connector 8. In addition, the measurement element housing 2 has a rectangular-solid-shaped upper housing part 68. In the upper housing part 68, a substantially cylindrical first chamber 70 and a substantially cylindrical second chamber 72 are formed. The two chambers 70 and 72 are connected to each other and are arranged relative to each other such that the cylinder axes associated with their cylindrical walls intersect each other at a right angle. The first chamber 70 opens in a narrow side of the upper housing part 68. The base 6 is inserted into the opening of the first chamber 70. The base 6 and the upper housing part 68 are fixedly and sealingly connected to each other.

The second chamber 72 opens in one of the long sides of the rectangular-solid-shaped upper housing part 68. A borehole, extending to the opposite long side and sealed by means of a stopper 74, comes out of the base of the second chamber 72. The assembly 20 is inserted into the second chamber 72. The assembly 20 is attached to the upper housing part 68 and sealed relative thereto by means of the sealing O-ring seated in the groove 30. A grooved pin 76, which is inserted into the upper housing part 68 and runs through a borehole in the plate 48 provides for accurately fitting alignment of the assembly in the second chamber 72.

Inside the first chamber 70, a helical spring 78 is arranged as an elastic measurement element. One end thereof is fixedly and sealingly connected to the base 6 such that the material to be measured can come out of the borehole 10 into the interior of the helical spring 78. A transfer lever 80 is attached to the other, free end of the helical spring 78. One arm 82 of the transfer lever 80 projects from one side of the assembly 20 into it. The magnet 18 is attached on the free end of the arm 82. The arm 82 runs substantially parallel to the base plate 24 and to the disk 48 as well as between the base plate 24 and the disk 48 and holds the magnet 18 in the zone between the two Hall sensors 38 and 40 (see FIG. 7). Since the axis of the helical spring 78 runs perpendicular to the axis of the arm 82, the arm 82 moves the magnet along a substantially rectilinear path of movement a distance which corresponds to the pressure-proportional deflection of the helical spring 78. The helical spring 78 is arranged in the first chamber 70 such that the rectilinear path of movement of the magnet 18 runs parallel to the guide rails 26 and to the grooves 46 formed therein. The pressure-dependent movement of the magnet 18 is converted into output signals of the pressure measurement device in the same manner as was described in the preceding in conjunction with the first embodiment.

The first embodiment with the aneroid capsule 12 is suitable for low-pressure zones, and the second embodiment with the helical spring 78 is suitable for higher pressures zones. The assembly 20 is, as described, designed such that it is equally suitable for both embodiments.

What is claimed is:

1. Pressure measurement device comprising:
   an elastic measurement element (12, 78), acted upon by a pressure to be measured;
   a measurement element housing (2), in which the measurement element is supported;
   a magnet (18) attached to the element and which is moved by the measurement element in reaction to a change of the pressure acting upon the measurement element along a substantially rectilinear path of movement;
   a first Hall sensor (38) operatively positioned to the side of the magnet outside its path of movement;
   an electronic circuit electrically connected to said first Hall sensor for processing the output voltage of the first Hall sensor into a first output signal;
   a sensor carrier (22), which supports said first Hall sensor and is attached to the measurement element housing; and
   a second Hall sensor (40) supported on the sensor carrier (22), said second Hall sensor being operatively positioned to the side of said magnet (18) outside its path of movement, said electrical circuit processing the sensor output voltage of the second Hall sensor into a second output signal.

2. Pressure measurement device according to claim 1, characterized in that the sensor carrier (22) includes a base plate (24) with an external side (28) and an internal side, said base plate being attached to the measurement element housing (2) such that its internal side faces the interior of the measurement element housing.

3. Pressure measurement device according to claim 2, characterized by light-emitting diodes (66) respectively associated with each of the Hall sensors (38, 40) for the display of the switch state, said diodes being mounted on the internal side of the base plate (24), said base plate being made of a light-permeable material.

4. Pressure measurement device according to claim 3, characterized in that for each light-emitting diode (66), a blind hole (64), into which the associated light-emitting diode projects, is formed in the base plate (24) starting from its internal side.

5. Pressure measurement device according to claim 2, characterized in that the two guide rails (26) on the base plate (24) are attached on its internal side.

6. Pressure measurement device according to claim 5, characterized in that the base plate (24) and the guide rails (26) are formed integrated in a single piece with each other.

7. Pressure measurement device according to claims 5, characterized by a disk (48), which is attached on the ends of the guide rails (26) remote from the base plate (24), said disk being substantially parallel to the base plate.

8. Pressure measurement device according to claim 7, characterized in that the disk (48) is made of metal.

9. Pressure measurement device according to one of claims 1 through 4, characterized in that the first and the second Hall sensor (34, 40) is in each case attached to a sensor mount (42) and that the sensor carrier (22) has two guide rails (26), which are in each case engaged with one of the sensor mounts such that the sensor mount is displaceable on the guide rail along a path of movement that runs parallel to the path of movement of the magnet (18).

10. Pressure measurement device according to one of claims 1 through 4, characterized by a printed circuit board (36) as the carrier of the electronic circuit and an electrical connection plug (34), whereby the circuit board and the connection plug are attached to the sensor carrier (22).

11. Pressure measurement device according to one of claims 1 through 4, characterized in that the magnet (18) is designed in a ring shape, whereby the plane of the ring runs perpendicular to the path of movement of the magnet.

12. Pressure measurement device according to one of claims 1 through 4, characterized in that the measurement element is an aneroid capsule (12).

13. Pressure measurement device according to one of claims 1 through 4, characterized in that the measurement element is a helical spring (78).

14. Pressure measurement device according to claim 9, characterized in that the sensor mount (42) has in each case a cylindrical section (44) and the guide rails (26) have in each case a groove (46) in which the cylindrical section sits displaceably.

15. Pressure measurement device according to claim 9, characterized by a set screw (50) for each sensor mount (42), whereby the set screw is engaged with the sensor carrier (22) and the associated sensor mount such that by pivoting the set screw, the sensor mount is displaced along its path of movement.

16. Pressure measurement device according to claim 15, characterized in that the respective set screw (50) has a threaded section (52) and a cylindrical head section (54) whereby the threaded section is in threaded engagement with the sensor mount (42) and the head section is mounted in the base plate (24) pivotably and immovably in the axial direction of the set screw and whereby the end surface of the head section is exposed on the external side (28) of the base plate.

17. Pressure measurement device according to claim 16, characterized in that the head section (54) has a circumferential sealing groove (62) into which a sealing ring is inserted.

18. Pressure measurement device according to claim 16, characterized in that the set screw (50) is made of plastic.

19. Pressure measurement device according to claim 16, characterized in that the head section (54) has a circumferential groove (58), in which a projection incorporated on the base plate (24) engages.

20. Pressure measurement device according to claim 19, characterized in that the projection is designed as a torus integrated in a single piece with the base plate (24) and that the head section (54) is provided over a part of its length with at least one axial slit (60), which starts from the end surface of the head section.

* * * * *